JOHN BOWLES.
4036 REISSUED JUN 21 1870
CORN SHELLER
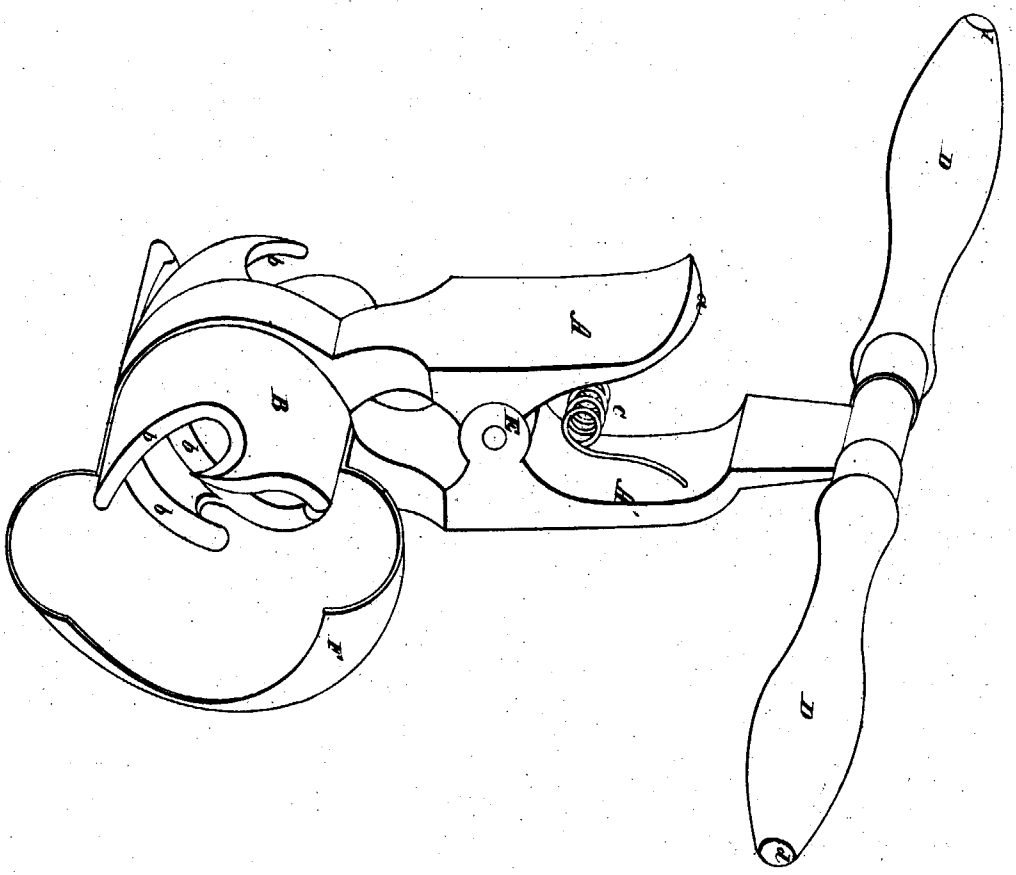
Witnesses:
W. B. Deming
Das L. Twin
John Bowles
J. P. Roos
By Knight Bros
Attys.

United States Patent Office.

JOHN BOWLES, OF AUGUSTA, GEORGIA, FOR HIMSELF, AND SAMUEL P. ROSS, OF PITTSBURG, PENNSYLVANIA, ASSIGNEE OF JOHN BOWLES.

*Letters Patent No.* 89,550, *dated May* 4, 1869; *reissue No.* 4,036, *dated June* 21, 1870.

IMPROVED CORN-SHELLER.

The Schedule referred to in these Letters Patent and making part of the same

JOHN BOWLES, of Augusta, in the county of Richmond and State of Georgia, invented a new and improved Corn-Sheller, of which the following is a specification.

*Nature and Objects of the Invention.*

The subject of the invention is a corn-sheller, consisting of a pair of arms hinged together at a point intermediate between their ends, carrying at one end jaws, which are held together by the action of a spring, and at the other end a handle, which is attached to one of the said arms, while the adjacent end of the other is suitably formed to receive pressure of the thumb, for the purpose of opening the jaws.

The accompanying drawing represents the machine in perspective, one-half of the shield or funnel being omitted to expose parts beneath.

*General Description.*

A A′ represent a pair of stems or levers, hinged together at E.

B B are a pair of jaws attached to the lower ends of the levers A A′, and constituting the shelling cylinder, their inner faces being provided with spiral or oblique ribs *b*, of any suitable number and form.

D D represent handles of wood or other material, connected by an iron rod, *d*, passing through them and through an eye in the upper end of the lever A′.

C represents a spring, which may be of any suitable shape, size, or material, applied between the levers A A′, in such a manner as to press the cob-jaws B together.

The upper part *a* of the lever A is made of the necessary length and shape to facilitate the pressing together of the upper ends of the levers by the thumb or hand of the operator, for the purpose of opening the cob-jaws.

F represents a shield or funnel made in two parts, and attached, by any suitable means, to the receiving ends of the respective cob-jaws B, to prevent the scattering of the grain. By a spring or other suitable attachment, the said funnel may be made removable from one end to the other of the cob-jaws, to adapt the instrument to be used either end forward.

*Operation.*

One of the handles D being grasped in the right hand, an ear of corn is taken in the left hand and introduced between the jaws, which are opened, if the form and size of the ear require it, by pressure of the thumb of the right hand upon the upper end of the lever A.

The instrument is then revolved around the ear.

The spiral ribs *b*, clinging to the cob, impart a longitudinal feed movement, causing the ends of the said ribs to separate the grains from the cob.

When the shelling is nearly completed, the opposite handle may be grasped by the left hand and the cob with the right hand, to complete the work.

*Claim.*

The arrangement of the arms A and A′, one attached to the handle D, and the other provided with a projecting thumb-piece, *a*′, the cob-jaws B, and the hinged joint E, located between the handle and the jaws, the said parts being constructed and combined to operate in connection with a suitable spring, substantially as herein described.

J. BOWLES.
S. P. ROSS.

Witnesses:
OCTAVIUS KNIGHT,
JAS. L. EWIN.